Nov. 21, 1967  R. D. LIGGETT ETAL  3,354,306
HOT-BOX DETECTOR
Filed April 28, 1964  2 Sheets-Sheet 2
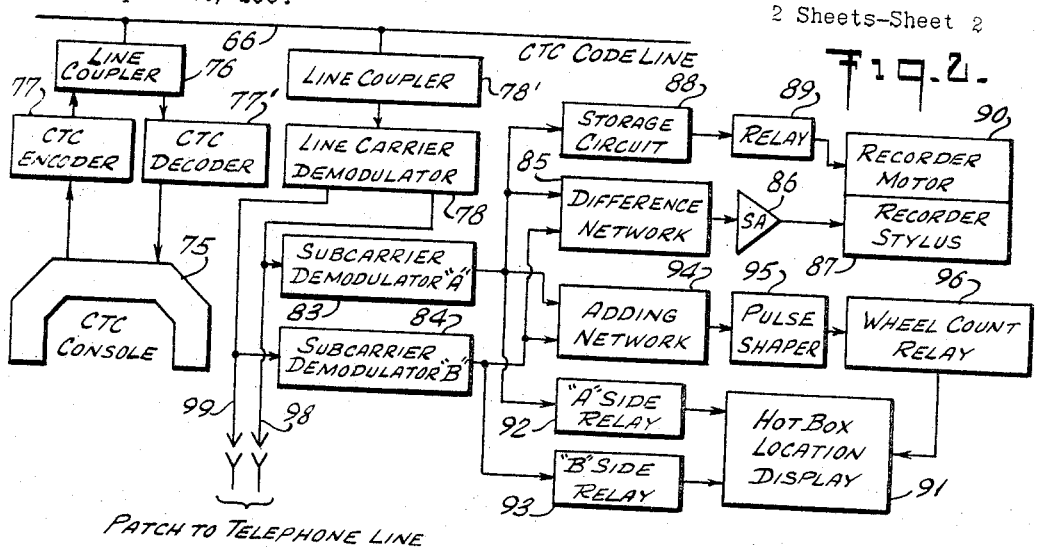
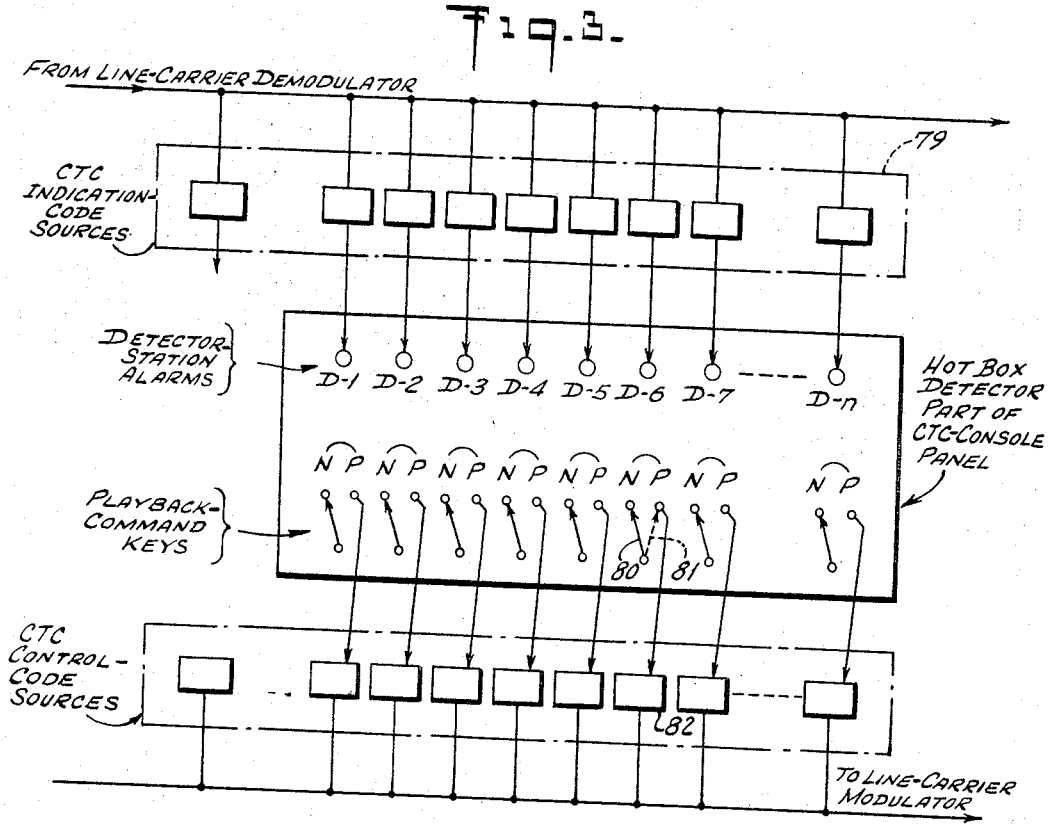
INVENTORS
R. D. LIGGETT
JAMES M. WHITE JR.
WILLIAM M. PELINO
Hopgood & Calimafde
ATTORNEYS

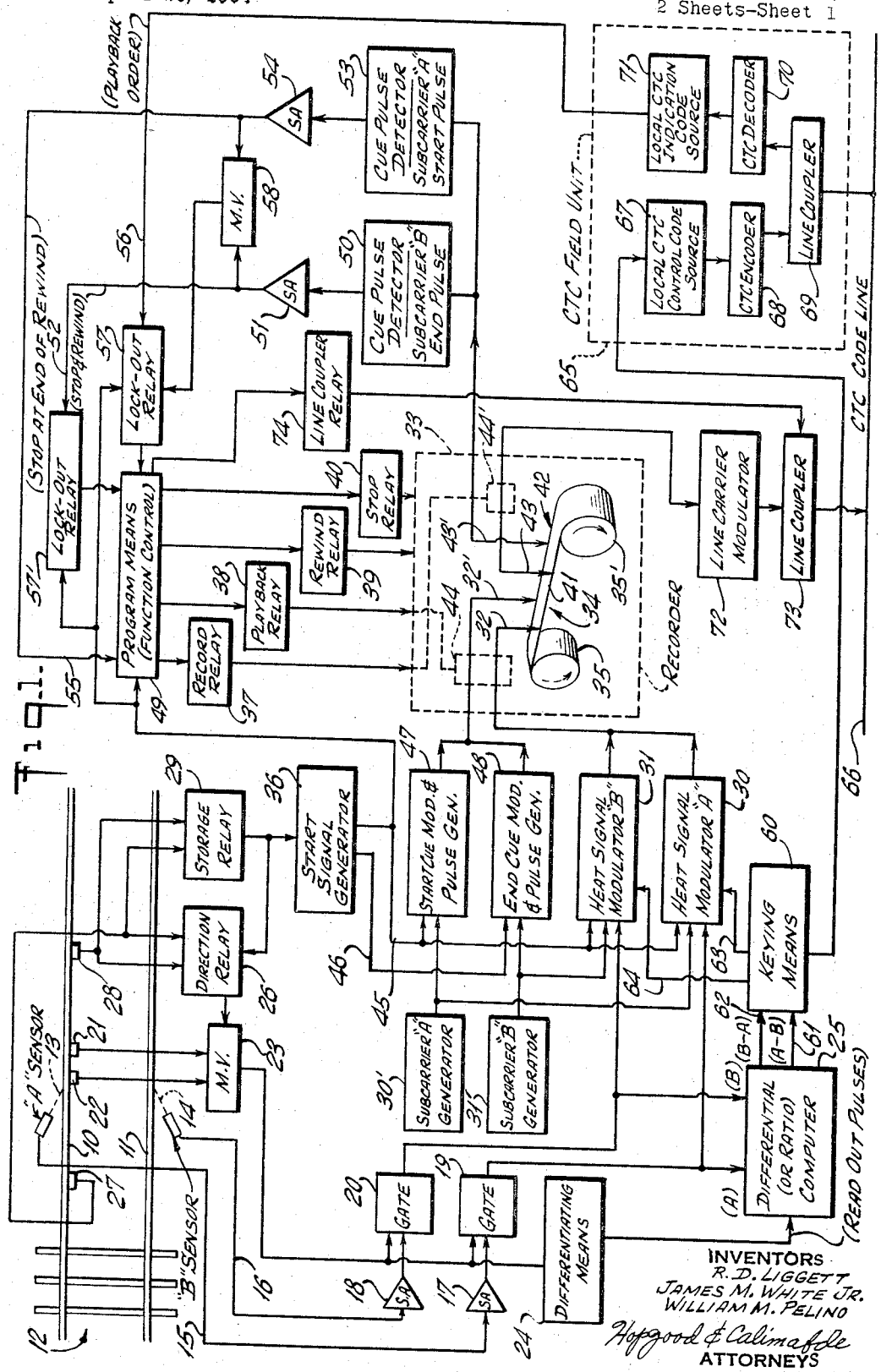

United States Patent Office 3,354,306
Patented Nov. 21, 1967

3,354,306
HOT-BOX DETECTOR
Robert D. Liggett and James M. White, Jr., Jacksonville, Fla., and William M. Pelino, Garden City, N.Y., assignors to Servo Corporation of America, Hicksville, N.Y., a corporation of New York
Filed Apr. 28, 1964, Ser. No. 363,135
11 Claims. (Cl. 246—169)

Our invention relates to railroad hotbox-detector systems and contemplates improved component relationships and interconnections whereby journal-heat information from one or more detection sites may be observed and acted upon from a single control point, as for example by the dispatcher having primary responsibility for signals and train movement over the full extent of a CTC (Centralized Traffic Control) territory, which may encompass hundreds of miles of track and many trains operating in both directions.

With increasing numbers of hotbox-detector installations on any given railroad, heavier demands have been placed on the communication facilities of the railroad. furthermore, the trend toward centralized control of operations, and the need for using carrier to transmit data over long distances, has made it appear that the available carrier spectrum might conceivably become saturated, merely in serving the hotbox detector installations on the line.

It is, accordingly, an object of the invention to provide an improved method and means whereby hotbox detector data may be more effectively and efficiently utilized.

Another object is to provide a system for remotely utilizing plural hotbox detector installations within a single communication channel, as for example a single channel of a multi-channel carrier operated network serving the territory.

It is a specific object to provide an improved centralized hotbox-detector utilization facility which will display remotely generated hotbox-detector data or the product of automatic interpretation thereof, primarily only when a need exists for the data.

It is another specific object to provide means for automatically storing hotbox detector data at or near a detector site, and to provide for the automatic remote reporting of such data via a single communication link, upon demand from the remote location, preferably only when a dangerous condition has been found to exist, or when it may be necessary to interrogate the equipment to check its fidelity of operation.

It is also a specific object to meet the above objects with an overall organization which lends itself to incorporation of new and further hotbox detector installations with minimum need for additional central equipment and connections thereto.

It is a general object to meet the above objects with an overall system organization meeting the above objects with economy of communication-link utilization and of personnel involvement and responsibility, with substantially reduced consumption of chart-recorders and recorder paper, with improved fidelity of remote data reception, with automatic axle-count and side-of-train indication of hotbox locations; all with important features making for more effective maintenance, and all with maximum sharing of equipment, to the end that numerous hotbox-detector installations may be monitored from a single central control office.

Other objects and various further features of novelty and invention will be pointed out or will occur to those skilled in the art from a reading of the following specification in conjunction with the accompanying drawings. In said drawings, which show for illustrative purposes only, a preferred embodiment of the invention:

FIG. 1 is a diagram schematically indicating component connections of the invention, being limited to components at or near a hotbox-detector site;

FIG. 2 is a similar diagram, for components cooperating with those of FIG. 1 and located at a central monitoring station, such as the dispatcher's office of a CTC-equipped railroad; and FIG. 3 is a block diagram illustrating further detail for some of the equipment of FIG. 2.

Briefly stated, the invention contemplates use of existing communication facilities, such as CTC or other station-selective network means, including radio, or telephone line, for reporting to a central control or observation station the existence of a hotbox that has been automatically detected at any one of a number of spaced and remote hotbox-detector sites within the railroad territory under observation. The observer (or CTC dispatcher) is given an immediate simple indication which enables him to identify the particular train which has journal trouble, so that he may take corrective action, as by routing the train to a passing track so that other traffic schedules will not be impaired. Meanwhile, the dispatcher will have operated a switch on his control panel, calling for the automatic playback of a recording of the train's journal-heat profiles, the recording having been made locally at or near the particular hotbox-detector site. When thus played back into the communication link, the dispatcher's chart recorder makes a permanent record of the tape-stored local recording, and a count may be displayed to identify and pinpoint the troublesome journal location with respect to the rest of the train. By the time the train reaches its switched-out location, a servicing crew will be on hand and can have been advised just which journal needs service, via telephone or radio. If the dispatcher has any personal doubt about interpretation of an erratic chart record (i.e., suggesting possible trouble with the system), he can telephone the signal supervisor and, without interfering with his telephone conversation, can "patch into" the telephone connection a further playback of the train's journal-heat profiles, so that a further chart record can at once be made for the signal supervisor, thus permitting the dispatcher and the supervisor to view their own separate charts of the same heat profiles while consulting about them by telephone.

Referring to the drawings, the equipment at an illustrative one of a number of hotbox-detection sites is shown and will be described in connection with FIG. 1; the observer or dispatcher office equipment will be described in connection with FIGS. 2 and 3. The particular hotbox-detector installation at trackside, and a number of the related component parts for automatic operation, preferably follow the teachings of U.S. Patents 2,880,309 and 2,963,575, to which reference is made for supplementary detail.

In order to simultaneously monitor journal-heat profiles on opposite sides of any given train, we show duplicate heat-sensing units, labelled A and B sensors, respectively, fixedly mounted alongside opposite rails 10-11 of a length of track 12. Each of the sensor units A and B will be understood to contain its own infrared detector element or cell (not shown) and having a sensitive area imaged by an optical system (not shown) along an axis (13-14) so as to scan train radiation indicative of journal-heat conditions; the sensors also contain their own preamplifier means and produce in output lines 15-16 electrical signals (video signals) reflecting the heat profiles that have been observed. The sensor outputs are supplied to signal amplifiers 17-18, are then individually gated at 19-20, and are then locally utilized in two concurrent operations of (1) evaluation to determine whether an alarm condition exists, and (2) subcarrier modulation for tape-recording or storage purposes.

The gating operation is preferably of the space-gate variety, and in application to sensors oriented for upward and inward slant-aspect viewing of journal boxes (against a background of car bottoms), the gate limits may be determined by suitably spaced wheel trips 21-22; trips 21-22 are shown mounted on the inner side of rail 10 and are preferably of the magnetic-induction variety in which an electric wheel-identifying pulse is developed for each passing wheel flange, as the flange varies the reluctance of the wheel-trip air gap. Thus, for a train proceeding from right to left (in FIG. 1, "forward-aspect" viewing), each wheel will produce a voltage pulse first at trip 21 and then at trip 22. These pulses are utilized to develop a gate pulse at pulse-generating means 23 including a double-stability multivibrator (M.V.), and the gate pulse is fed to control both gates 19-20 in unison; the end of the gate pulse is identified by differentiating the gate pulse at 24 to provide a "readout pulse" for operation of the alarm computer 25, to be later described.

For trains proceeding in the opposite direction ("trailing-aspect" viewing), trip 22 is actuated first and trip 21 second, for each passing wheel. The multivibrator 23 will generate gate signals in the manner described, but in the case of certain types of multivibrators the gate pulse may be of opposite polarity, depending upon the direction of train passage. To avoid such polarity shift in the gate pulse, we show a direction relay 26 connected to generator 23, whenever a particular direction of train traffic is sensed. Thus, with relay 26 connected to additional wheel trips 27-28 on opposite sides of the gate trips 21-22, means are provided for sensing traffic direction, a first pulse at 27 (i.e., ahead of a pulse at 28) serving to determine a first state for relay 26 and to lockout any change of state until the train has passed by completely; the reverse state of relay 26 will have been established (and maintained) should traffic in the opposite direction have been sensed by initial operation of trip 28. In both situations, it will be understood that if relay 26 is of the delayed dropout variety, there may be enough inherent storage capacity in relay 26 to assure maintenance of a given state, once actuated, for passage of even the slowest trains; however, we show at 29 a storage relay incorporating sufficient storage capacity to assure against such change of state, for any given train. A storage time constant of the order of 5 seconds at 29 is found adequate to hold relay 26 for trains proceeding as slow as 5 miles per hour.

The storage device for storing video signal records representing both heat scans of a given train may be a magnetic-tape recorder of conventional construction, as for example, one of those employing push-button operated electric switches for optional selection of the recording function (accompanied by erasure of what may already exist as a recording just prior to that point on the tape where the new recording is to be made), the "stop tape advance" and "rewind the tape" functions, the "stop rewinding" function, and the "playback" function. In our utilization of such a tape recorder, these functions will be understood to be selected and utilized through relays (not shown), in place of the push-buttons, the relays receiving their command signals from circuitry and means to be described.

We achieve a number of the above-stated objects by modulating separate carriers with the gated video signals from both sides of the track, for any given scanned train; the frequencies of these carriers are preferably closely spaced and are recorded on the same single channel of tape, preferably at the upper voice region of the standard voice communication band of 3 kc. Thus, we show first and second carrier modulators 30-31 for the A-sensed gated video signal and for the B-sensed gated video signal; since, in the form shown, these modulated signals are impressed on a CTC carrier of higher frequency, the modulators 30-31 are designated subcarrier modulators, and the modulation applicable to tape recording will be referred to as subcarrier modulation. The combined outputs of modulators 30-31 are shown connected to the recording head 32 of the tape recorder unit 33.

We have found that a frequency spread of substantially ±40 c.p.s. provides adequate fidelity for accommodation of a given gated video signal, for the above-mentioned "slant-aspect" scan and for the range of speeds of present-day trains. Thus, we find that a standard 170 c.p.s. (center-to-center) spacing between subcarrier bands is entirely adequate. Actually, such close spacing between center frequencies of generators 30'-31' for modulators 30-31 is preferred, as will later be clear. In order that a slow standard recording speed (e.g., 3½ inches per second) for the tape 34 of recorder 33 can well accommodate the modulated subcarriers, without interference with the adult male voice spectrum, we prefer that the subcarrier frequencies at 30-31 be in the range of substantially 2000 to 3500 kc., and we have, for example, employed 2125 and 2295 c.p.s., respectively, with highly satisfactory results.

The subcarrier modulators 30-31 are shown connected for control by a start-signal generator 36, for commencement and continued operation of the modulation function. Generator 36 derives its function from the storage relay 29, so that as long as wheel pulses at trips 27 and 28 are developed with great enough repetition frequency, meaning as long as a train is going by, the modulators 30-31 continue to operate. Five seconds after the train has gone, modulators 30-31 are switched off.

In order to avoid undue complexity in the drawing of the recorder 33, resort has been made to a simplified schematic showing, it being understood that such recorders are commercially available. Suffice it to say that the magnetic tape 34 may be of standard structure, of two-channel width, and that it may run normally from a supply reel 35 to a take-up reel 35'. The normal direction of take-up reel rotation during "recording" or "playback" functions is suggested by the solid arrow at 35'; the normal direction of supply-reel rotation during the "rewind" function is suggested by the dashed arrow at 35. Drives, clutching, and braking means to achieve reel motion for these functions are not shown but will be understood to be governed by various relays which are shown, namely, the record relay 37, the playback relay 38, the rewind relay 39, and the stop relay 40.

In our preferred embodiment, we simultaneously utilize both channels of a two-channel tape; the first channel (denoted 41) receives the video-modulated carriers from both modulators 30-31, and the second channel (denoted 42) stores suitable "cue" signals, for use in automatic playback and rewind functions. The second channels thus has its own separate recording head 32', alongside the head 32, and pickup heads 43-43' similarly serve the respective channels 41-42. The effective disconnection of signal supply to recording heads 32-32' is suggested at lock-out means 44, with a control connection (dashed line) to the playback relay 38. A similar lock-out device 44' in the output of the pickup for the video channel 41 assures against transmission of recorded video while a recording is being made.

The "cue" signals are merely for the purpose of identifying the beginning and end tape locations for heat-signal recordings for any given train. Actually, a single CW (continuous-wave) recording of one of the carrier frequencies generated at 30' or 31' would be adequate for the purpose if the length of CW recording were timed by start-signal generator 36, meaning that a train is still passing the wheel trips 27-28. However, in the form shown, a first control connection 45 from generator 36 to a "start-cue" modulator 47 will be understood to indicate generation of a short identifying pulse or wavetrain at the frequency of subcarrier A (30'), every time the onset of train passage is detected; similarly, a short identifying pulse or wavetrain at the frequency of subcarrier B (31') is generated at "end-cue" modulator 48 (through action of a second connection 46 from generator 36)

five seconds after the last wheel of a passing train has been detected. Both "start" and "end" cue pulses are recorded at 32' on the second tape channel 42.

Since the recorder 33 operates automatically and unattended, we schematically indicate at program means 49 that, in response to particular input control signals, appropriate control relays from among those designated 37, 38, 39, 40 are actuated to establish the desired operation of recorder 33. Thus, upon receipt of a "start" signal from generator 36, relay 37 is operative to assure storage in channel 41 of the complete video-modulated subcarrier signals for both sides of the train. When the train has passed, and after a 5-second interval, the "end-cue" pulse is generated, recorded, and then detected by a "Cue Pulse" detector 50. The end-cue pulse is thus reconstituted at 50; the resulting signal may be amplified by signal amplifier 51 and supplied at 52 to the program means 49 to determine "stop" and "rewind" functions at relays 39–40, it being understood that at the same time recording or playback functions (at 37 or 38) are thereby immediately terminated. Similarly, at the end of a "rewind" function, that is, when the recorded tape is returned to the supply reel 35, suitable cue-pulse detector means 53 will detect and reconstitute the "start-cue" pulse in a form suitable for signal amplification at 54 for operative connection at 55 to another program input, determining actuation of relay 40 to stop the rewind and thus condition the tape 34 for later recording or playback as occasion may demand.

In accordance with the invention, a playback command is received over the communication link to the dispatcher or signal supervisor. In FIG. 1, this is simply indicated as an electrical control line 56, which may be the output of local CTC equipment. The playback connection to program means 49 preferably includes lock-out relay means 57, which may be normally closed, so that a CTC-delivered playback order may be immediately operative on relay 38 to determine playback of the rewound tape. To assure that no playback will be initiated as long as a rewind operation is in progress, we provide suitable interlock with the rewind function, as by means of a double-stability multivibrator or flip-flop 58 generating a lock-out signal for relay 57, commencing with detection of the end pulse at 50 (start of rewind) and ending with detection of the start pulse at 53 (end of rewind). Also, to assure that no playback will be initiated as long as a recording is being made (i.e., a train is passing the heat sensors), the signal from the start-signal generator 36 is provided with an interlocking connection with relay 57; a similar interlock connection to another lock-out relay 57' assures dominance of recording over rewind functions. Thus, it will be seen that, as long as tape is being rewound or a recording is being made, no playback command can be effective to disturb the continued recording or rewinding operation of recorder 33; furthermore, the described connections assure that if another train should be detected at 27 or 28 while a playback or rewind operation is in progress, the lock-out relays 57–57' will be operated to stop such playback or rewind functions and to permit instantaneous commencement of the new recording, even if it means that the new recording will not be starting at the beginning of the tape. Periodic maintenance checking at relatively infrequent intervals is all that is needed to make sure of the availability of an adequate supply of tape 34 for any length train that may be encountered, even for the slowest train speeds, as will be understood.

In order that the dispatcher may be advised immediately of the existence of an alarm condition on the train, once the dangerous journal has been spotted, we provide keying means 60 furnishing a short control pulse or "off" signal for each detected overheated journal. The keying means 60 will be understood to suitably operate the local CTC Control-Code Source (designated generally at 67) so that the fact of the alarm condition may be automatically recognized and indicated on the dispatcher's panel, identified as to detector locale (i.e., an alarm condition at one detector location being displayed in a manner uniquely distinguishable from a concurrent similar condition detected at a location many miles away). Keying means 60 is thus operated in response to the instantaneous determination by alarm computer 25 that a heat differential, exceeding a predetermined "safe" threshold differential, has been detected. The computer 25 may be as described in said Patent 2,963,575; it suffices here merely to state that upon the conclusion of each gate interval, computer 25 utilizes "read-out" pulses from 24 to simultaneously make two evaluations of stored A and B heat signal magnitudes—in a first determination the A minus B $(A-B)$ differential is compared against the minimum threshold, and in a second determination the B minus A $(B-A)$ differential is compared against the same threshold. Whenever threshold is exceeded for either one of these comparisons, a particular one of two outputs 61–62 carries a short pulse signal, polarized for a particular side of the track; thus, a signal in line 61 means a dangerous or potentially dangerous journal condition on the A side of the track (over rail 10), and a signal in line 62 means a similar condition on the B side of the track (over rail 11). In either event, keying means 60 is immediately effective to signal the dispatcher.

In order that the recorder 33 may store alarm as well as heat-video information, we show separate control connections 63–64 from keying means 60 to the respective subcarrier modulators 30–31. Lines 63–64 will be understood to correspond to lines 61–62, in the sense that an alarm-indicating pulse developed in line 61 will (via line 63) momentarily key-off modulator 30, in the interval preceding heat-scan for the next journal; similarly, modulator 31 will be momentarily keyed-off, for a detected dangerous condition on the B side of the track. Of course, the tape recording in the video channel 41 will reflect the momentary absence of subcarrier signal, and so also will the remotely transmitted playback of the recording reflect the momentary absence of subcarrier signal.

To complete the description of equipment at or near the detector site, we show a CTC field unit 65 and means for working all transmission to or from the dispatcher's office via a CTC code line 66. The field unit 65 is shown to include transmission means for the signal keyed at 60 and representing an alarm condition; for this purpose, a local CTC Control-Code Source 67 is activated to encode a CTC encoder 68, and the resulting output is applied via a line coupler 69 to the CTC code line. The field unit 65 also includes reception means for identifying and translating the dispatcher's command for the playback of a recording, into a playback order in line 56; for this purpose, a CTC decoder 70 operating from the line coupler 69 supplies decoded signals to the local CTC indication-code source 71 for recognition of command signals unique to the particular detector installation shown, thus rejecting similar command signals intended for one or more detector sites located elsewhere on the railroad. Finally, whenever a recording is played back, the two modulated subcarrier signals picked up from channel 41 are supplied to means 72 for modulating the line carrier and, via line coupler 73, to the CTC code line 66; in this connection, it will be noted that a line-coupler relay 74 operated by program means 49 may condition coupler 73 for and during transmission of recorded signals in the CTC code line 66.

Referring to FIG. 2, the dispatcher's office equipment is seen to include a CTC console 75 connected to the CTC code line 66 via line coupler means 76 and suitable CTC encoder and decoder means 77–77', respectively. The console equipment pertaining to hotbox-detector supervision is shown in greater detail in FIG. 3, wherein legends identify the line on which CTC code signals appear from the CTC decoder 77'. These code signals will, of course, be for many and various CTC signalling and switching purposes, and at 79 we generally designate only those CTC-indication-code sources which are utilized for recognition of coded alarm signals from different hotbox-detector sites (of which FIG. 1 illustrates but one). For each such alarm, recognition at 79 will be unique in one to the exclusion of all other output lines, and a particular one of the detector-site indicator lamps will be operated on the panel of console 75. In FIG. 3, these lamps are shown as circles, designated "Detector Station Alarms," with appropriate individual legends, such as D–1, D–2, D–3 . . . D*n*, applicable to as many as *n* hotbox-detector sites as may be operative in the CTC territory. Thus, if the detector installation of FIG. 1 is assumed to carry the identification "D–6," then lamp D–6 will become illuminated on the panel of console 75 as soon as the first hotbox condition is ascertained upon readout of the computer 25. When the dispatcher spots such an indication, he can ask for a playback of the heat-signal recording by operating the applicable one of the various playback command keys on his console panel; in the case of a "D–6" alarm condition, he would operate key 80 from the normal (N) position shown to the playback position (P) thereof (dashed key position 81). Such operation of playback position (P) activates the particular one (82) of various CTC control-code sources that is unique to the detector site of FIG. 1, and there is immediately impressed on the CTC code line 66 (via the CTC Encoder 77) a playback code signal which will be recognized only at 71, and not at any other local CTC indication-code source. Assuming no lock-out conditions exist at 57–57′, the recorder 33 will be caused to transmit at 72–73 a playback of the recording which contains the overheated journal signal.

At the dispatcher's office, the line carrier demodulator 78 (via an associated line coupler 78′) re-establishes the two modulated-subcarrier signals, for separate subcarrier demodulation at 83–84. The respective outputs of these demodulators 83–84 will be the gated video signals representing heat-scanning of both sides of the train. These signals are fed into a difference network 85 and are then amplified at 86 for operation of a chart recorder stylus movement 87; at the same time, the mere presence of demodulated heat pulse signals is utilized, through a suitable storage circuit 88, to develop a signal for closing and holding in the relay 89 for the chart-recorder drive motor 90. The resulting chart recording will be a single trace in which pulse excursions to one side of the display axis will representing A–B predominance (that is, A greater than B), and excursions to the other side of the axis will represent B–A predominance, as will be understood. True differentials will thus be displayed, and the seriousness of the overheated journal condition may be evaluated from magnitude of displayed differential for any given axle. It is to be noted that, by taking the difference just prior to recording, and by having employed closely related subcarriers, noise factors involved in transmission to the dispatcher's office will be virtually identical in the outputs of demodulators 83–84, so that noise cancellation is virtually complete, and "clean" recordings are achieved at 87.

In order that the dispatcher may be presented with location data for the troublesome journal or journals, we employ a hotbox-location display device 91 similar to that described in detail in said Patent 2,963,575. Such locator displays indicate, for each of a number of hotbox conditions on a given train, both the side of the train and the axle count, as from that location to the end of the train. Thus, for each detected hotbox, a wheel-count mechanism in display 91 will be enabled. It will be recalled that basic hotbox determination is made at the site (FIG. 1), and that keying means 60 was then operative to momentarily key "off" the appropriate one of the two subcarrier modulators 30–31. At the dispatcher's office (FIG. 2), this fact is recognized by the appropriate one of two relays 92–93. Thus, for a hotbox found on the A side, relay 92 is operative on display means 91 to immediately register trouble on the A side of the train and to start counting and indicating axles from that spot to the end of the train. A further subcarrier channel could be employed to transmit axle-counting pulses from one of the wheel trips 21–22–27–28 to the dispatcher's office, but we prefer to use only the described two subcarrier channels and to derive wheel or axle-counting pulses from the restored gated video signals. For this purpose, we add both signals in a network 94, and amplify, limit, clip, and otherwise shape them at 95 for operation of a wheel-count relay 96 associated with display means 91.

It will be seen that we have described an improved hotbox detector system and a method for substantially improved utilization of hotbox detector information. We make it possible to economize on the use of chart recorders, recorder paper and personnel for interpretation of recorded data. We also make it possible for more effective maintenance and for checking overall operation from remote or central locations. Thus, for example, the signal engineer may be equipped with components matching those identified 83 through 90 (or 83 through 96) and, merely by "patching" the signal-engineer's telephone line to the dispatcher at 98–99, it has been found practical for the dispatcher and the engineer to discuss details of the same chart recording (each man having his own local display of the same); we have actually transmitted such subcarrier modulations over a single commercial telephone line for distances in the order of 1000 miles, while using the same telephone-line connection for voice commentary about the recording. The dispatcher can thus have at his hand immediate expert analysis of the recording so that his decision to cut out or not to cut out the car, or for some other traffic decision, may be more firmly based.

While we have described the invention in detail in connection with a preferred embodiment and method, it will be understood that modifications may be made without departing from the scope of the invention as defined in the claims which follow.

We claim:

1. The method of detecting overheated journals on moving railroad trains with first and second electrical detector elements each producing an electrical signal in response to infrared radiation incident thereon, which comprises optically imaging said detector elements on fixed axes to concurrently observe corresponding heat-radiation profiles of passing trains for journal heat at correspondingly locations on opposite sides of the trains, modulating a first subcarrier frequency with the signal output of one of said detector elements, modulating a second subcarrier frequency with the signal output of the other of said detector elements, the difference between said subcarrier frequencies being relatively small compared with either of the subcarrier frequencies, transmitting said modulated subcarrier frequencies to a remote location as modulations of a single carrier frequency, demodulating said carrier frequency and said subcarrier frequencies at the remote location to derive reconstituted separate signal outputs corresponding to those of said detector elements, simultaneously differentially comparing said reconstituted separate signal outputs, whereby noise factors common to both transmissions are cancelled, and recording as a function of time the resulting signal difference between said reconstituted separate signal outputs.

2. The method according to claim 1, in which said carrier frequencies are both at the upper part of a standard voice-communication frequency band.

3. The method of claim 2, in which said frequencies are both in the range of 2000 to 3500 cycles per second and are spaced from each other by less than 10% of the lower carrier frequency.

4. The method of claim 2, in which said frequencies are both in the range of 2000 to 3000 cycles per second and are spaced from each other in the order of 170 cycles per second.

5. Apparatus for detecting overheated journals on railroad trains moving past a given track location, comprising a first scanner fixedly mounted on one side of the track and a second scanner fixedly mounted opposite said first scanner on the other side of the track, each scanner including a detector element producing an electrical signal output responsive to incident infrared radiation and optical means imaging the same to an elevation at which journal heat radiations of corresponding opposed parts of passing trains will be concurrently scanned by said elements, first means modulating with a first carrier the signal output of one of said detectors, second means modulating with a second carrier the signal output of the other of said detectors, storage-tape recording means connected to the outputs of said first and second modulating means and simultaneously storing on a single recording tape the two modulated-carrier outputs, a remote observation station and a communication link from said station to the apparatus at said track location, threshold difference comparison means connected to the outputs of both detector elements and operative to produce an alarm signal output upon detection of an instantaneous detector-signal difference exceeding a given threshold level, alarm-indicating means at said observation station and connected via said link to the output of said difference-comparison means, said recording means including playback-control means including means at said observation station selectively operable via said link to call for the playback of a tape-stored recording via said link to said observation station, and indicating display means at said observation station and connected to said link and including demodulating means for reconstituting the detector output signals for indicating and display purposes at the observation station, whereby if an alarm condition is detected at the detector location, a detailed indication or display of the journal-heat profiles of a given train may be thereupon indicated or displayed at the observation station.

6. Apparatus for detecting overheated journals on railroad trains moving past a given track location, comprising a first scanner fixedly mounted on one side of the track and a second scanner fixedly mounted opposite said first scanner on the other side of the track, each scanner including a detector element producing an electrical signal output responsive to incident infrared radiation and optical means imaging the same to an elevation at which journal heat radiations of corresponding opposed parts of passing trains will be concurrently scanned by said elements, first means modulating with a first carrier the signal output of one of said detectors, second means modulating with a second carrier the signal output of the other of said detectors, storage-tape recording means connected to the outputs of said first and second modulating means and simultaneously storing on a single recording tape the two modulated-carrier outputs, said recording means including rewind means and playback means, track-mounted wheel-operated means operative to produce a wheel-identifying electrical signal pulse for a wheel on each axle in immediate approach to the track location at which said detector elements scan journal heat for such axle, train-indicating relay means including a storage element and connected to the output of said wheel-operated means, said storage element having a time constant such that for wheel-identifying pulses of periodicity representing more than a given minimum train speed, said relay means maintains a first state and that for pulse periodicity representing less than said given minimum train speed said relay means reverts to a second state, start-cue signal-generator means connected to said relay means and responsive to change from said second state to said first state to produce an electrical start-cue signal, end-cue signal-generator means connected to said relay means and responsive to change from said first state to said second state to produce an electrical end-cue signal, means connecting both said start-cue and said end-cue signal-generator means in recording relation with said storage-tape recording means; a remote observation station and a communication link from said station to the apparatus at said track location, threshold difference comparison means connected to the outputs of both detector elements and operative to produce an alarm signal output upon detection of an instantaneous detector-signal difference exceeding a given threhold level, alarm-indicating means at said observation station and connected via said link to the output of said difference-comparison means; said recording means including means operative during a rewind operation thereof and responsive to detection of a recorded start-cue signal to stop the rewind operation and thereby place the recording means in condition either for acceptance of a new recording or for playback of an existing recording, said recording means further including means responsive in the alternative (1), during a recording operation, to a change of said relay means from said first state to said second state and (2), during a playback operation, to detection of a recorded end-cue signal to stop the recording operation and to start a rewind operation; said recording means including playback-control means including means at said observation station selectively operable via said link to call for the playback of a tape-stored recording via said link to said observation station, and indicating display means at said observation station and connected to said link and including demodulating means for reconstituting the detector output signals for indicating and display purposes at the observation station, whereby if an alarm condition is detected at the detector location, a detailed indication or display of the journal-heat profiles of a given train may be thereupon indicated or displayed at the observation station.

7. Apparatus according to claim 5, in which keying means connected to said difference-comparison means is operative in the presence of an alarm-signal output thereof to momentarily key off one of said modulating means, said alarm-indicating means being responsive to a detected momentary absence of the carrier signal of said keyed modulating means.

8. Apparatus according to claim 6, and including lockout relay means for said playback-control means and operative during the making of a recording to prevent initiation of a playback operation.

9. Apparatus according to claim 8, in which said lockout relay means is responsive to a change of state of said train-indicating relay means from said second state to said first state to initiate a new recording operation regardless of whether said recording means may or may not have been playing back or rewinding at the time said last-mentioned change of state is detected, whereby under no circumstances will a passing train fail to record its journal-heat profiles on said storage-tape recording means.

10. Apparatus according to claim 5, in which said indicating display means includes a moving-chart recorder, said recorder including stylus-drive means responsive to the instantaneous difference between demodulated detector output signals.

11. The method of detecting overheated journals on moving railroad trains with first and electrical detector elements, each producing an electrical signal in response to infrared radiation incident thereon, which comprises optically imaging said detector elements on fixed axes to concurrently observe corresponding heat-radiation profiles of passing trains for journal heat at corresponding locations on opposite sides of the trains, gating out of the output signals of said detectors all parts of the video signals except substantially only those parts thereof which reflect the actual time of scanning for journal heat, modulating a first subcarrier frequency with the gated signal output of one of said detector elements, modulating a second subcarrier frequency with the gated signal output of another of said detector elements, the difference between said subcarrier frequencies being relatively small compared with either of the said subcarrier frequencies, transmitting said modulated subcarrier frequencies to a remote location as modulations of a single carrier frequency, demodulating said carrier frequency and said subcarrier frequencies at the remote location to derive reconstituted separate signal outputs corresponding to those of said detector elements, simultaneously differentially comparing said reconstituted separate signal outputs, whereby noise factors common to both transmissions are cancelled, and recording as a function of time the resulting signal difference between said reconstituted separate signal outputs.

References Cited

UNITED STATES PATENTS

| | | | |
|---|---|---|---|
| 2,027,718 | 1/1936 | Bushnell | 246—122 |
| 2,206,550 | 7/1940 | Mordin | 246—3 |
| 2,514,578 | 7/1950 | Heller et al. | 179—100.2 |
| 2,635,182 | 4/1953 | Judge | 246—3 X |
| 2,668,283 | 2/1954 | Mullin | 179—100.2 |
| 2,685,079 | 7/1954 | Hoeppner | 179—100.2 |
| 2,782,398 | 2/1957 | West et al. | 179—100.2 |
| 2,840,800 | 6/1958 | Chester | 179—100.2 |
| 2,880,309 | 3/1959 | Gallagher et al. | 246—169 |
| 2,904,682 | 9/1959 | Rawlins | 179—100.2 |
| 2,963,575 | 12/1960 | Pelino et al. | 246—169 |
| 3,109,616 | 11/1963 | Hailes | 246—107 |
| 3,115,289 | 12/1963 | Namenyi-Katz | 179—100.2 X |
| 3,197,632 | 7/1965 | Baughman | 246—169 |
| 3,206,596 | 9/1965 | Howell | 246—169 |
| 3,226,540 | 12/1965 | De Priest | 246—169 |

FOREIGN PATENTS 805,487  12/1958  Great Britain.

OTHER REFERENCES

"Questions on Hotbox Detectors," October 1960 issue of Railway Signaling and Communications, pages 19–21.

"Instant Hot Box Location," September 1959 issue of Railway Signaling and Communications, 25–27.

"Carrier and Automatic Alarm Added to Hotbox Detector," October 1959 issue of Modern Railroads, page 91.

"Expanded Systems," 8 pages Servo Corp. publication, Patent Office Mail Room date Mar. 3, 1960.

ARTHUR L. LA POINT, *Primary Examiner.*

S. T. KRAWCZEWICZ, *Assistant Examiner.*